Nov. 6, 1928.  1,690,452
J. P. MANENT ET AL
MACHINE FOR THE MANUFACTURE OF WIRE SPIRAL
Filed July 30, 1926
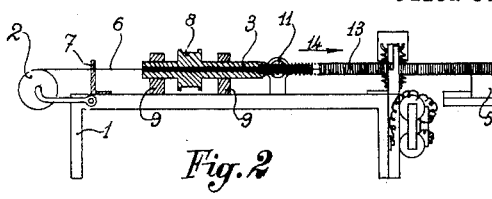
Fig. 2
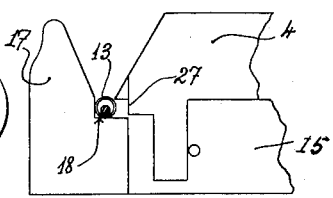
Fig. 4.
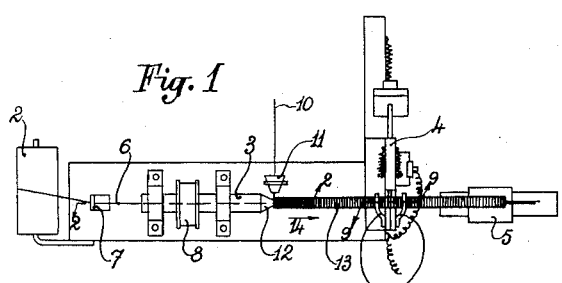
Fig. 1
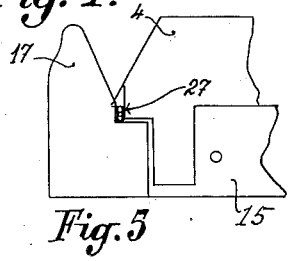
Fig. 5
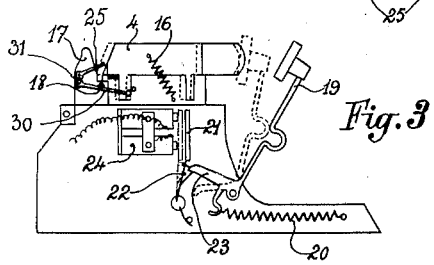
Fig. 3
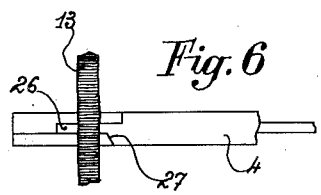
Fig. 6
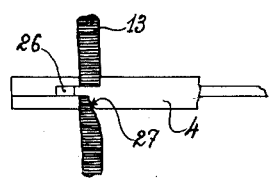
Fig. 7
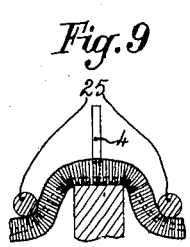
Fig. 9
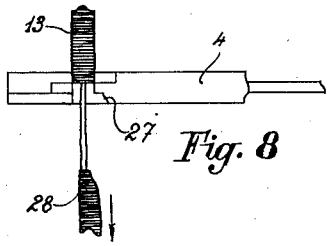
Fig. 8
Fig. 10
Inventors:
Jean Pierre Manent
and Marius Manent
By
Attorney.

Patented Nov. 6, 1928.

1,690,452

UNITED STATES PATENT OFFICE.

JEAN PIERRE MANENT AND MARIUS MANENT, OF LYON, FRANCE.

MACHINE FOR THE MANUFACTURE OF WIRE SPIRAL.

Application filed July 30, 1926, Serial No. 126,040, and in France August 1, 1925.

This invention has for its object a machine for the manufacture of wire spiral.

Wire spiral is obtained at the present time by means of winding spindles which deliver it in indefinite lengths. It is cut in pieces of appropriate length through which a thread is passed, this work being done by hand.

The machine according to the present invention winds the wire spiral directly on the thread and cuts it in any appropriate length without cutting the thread. It thus avoids a considerable expense of hand-work.

This machine comprises in combination:

1. A hollow spindle through which the thread is passed, the wire spiral being wound on said spindle.

2. A cutting-device through which the wire spiral is passed, said device being provided with a recess for the wire-spiral the height of which is such that only the upper part of the wire spiral is cut.

3. An electromagnetic device which acts on said cutting device when a predeterminate length of wire spiral has been made.

Such a machine is schematically shown in the annexed drawings.

Fig. 1 is a plan view.

Fig. 2 is a side elevation with parts in section on line 2—2 (Fig. 1).

Fig. 3 is an end view of the cutting-device.

Figs. 4 and 5 are enlarged fragmental end views of the cutting device in two different positions.

Figs. 6 and 7 are corresponding plan views.

Fig. 8 is a plan view showing how the lengths of wire spiral are separated from each other.

Fig. 9 is an enlarged section on line 9—9 (Fig. 1).

Fig. 10 shows the finished article.

The illustrated machine comprises a frame 1; a reel bobbin 2 from which is unrolled the thread 6 which is to form the core of the wire spiral; a hollow rotating spindle 3; a cutting device the cutter of which is shown at 4; and an electromagnetic device for actuating cutter 4, said electromagnetic device being energized through a contact 5. A driving reel 29 is provided at the front of the machine.

The thread 6 which is unrolled from reel 2 is passed through an eye 7 and thence through the hollow spindle 3 which is rotated by means of a belt-driven pulley 8. Spindle 3 is supported by bearings 9.

The wire 10 which is to form the wire-spiral, is unwound from reels or the like (not shown). It is passed through a guide 11 and then is wound on the conical portion 12 of spindle 3 by the rotation of the latter, the slope of said portion 12 being such that the wire spiral 13 slides axially in the direction of arrow 14 under the combined action of said slope and of guide 11.

The wire spiral and its core pass through the cutting device, the previously-mentioned cutter 4 of which is slidable on a member 15 fixed to the frame 1, springs 16 being provided for acting on cutter 4. An abutment 17 is placed in front of cutter 4 and is provided with a recess 18 through which the wire spiral passes. Cutter 4 is actuated by a lever 19 which is acted upon by means of a spring 20. A lever 21 is provided with a stop 22 on which rests an arm 23 integral with lever 19, and forms the armature of an electromagnet 24. As will be readily understood from Fig. 3, when lever 21 is attracted by electromagnet 24, arm 23 is disengaged by stop 22 and spring 20 is free to move lever 19 which strikes cutter 4. The latter is driven against abutment 17.

A forked member 25 (Fig. 1) may be lowered on the wire-spiral on each side of the cutting device, as clearly shown in Fig. 9. This member 25 has a depending arm 31 (Fig. 3) which is connected by a link or rod 30 with the sliding cutter 4 that is operated by lever 19, so that said member will be lowered when the cutter is struck by the lever.

Abutement 17 is preferably provided with a recess 26 (Figs. 6 and 7) for cutter 4, and the latter has an inclined projection 27 the object of which will be explained later.

The working is as follows:

The thread 6 is unwound from reel 2 by the driving reel 29, and the wire 10 is wound spirally on it by the hollow rotating spindle 3, the speed of the driving reel being preferably made equal to the speed at which the wire is fed. When the wire-spiral comes in contact with contact 5 a circuit is closed which energizes electromagnet 24. As above explained, the forked member 25 is lowered (Fig. 9) and cutter 4 is brought into action. It cuts the upper parts of the wire spiral (Fig. 9) but does not cut the core which has been lowered by the double bend of the wire spiral under the action of the forked member 25. The inclined portion 27 of cutter 4 squeezes the wire spiral around the thread (Figs. 5 and 7). It must be noted that cutter 4 returns immediately to its normal position of Fig. 4 after having been struck by lever 19, as springs 16 are made stronger than spring 20.

Lever 19 is then brought back by hand or by any appropriate means. The speed of the driving reel 29 on which the finished article is wound is then accelerated by hand or otherwise. The first length 28 of the wire-spiral is thus moved away from the end of the length 13 which is being continuously delivered by the winding spindle (Fig. 8). The finished article is illustrated in Fig. 10.

The driving reel is then brought again to its normal speed and the working is repeated as explained before.

In lieu of accelerating the driving reel, the speed of thread 6 could be made somewhat higher than the speed of the wire-spiral. The end of the first cut length 28 would thus travel at a higher speed than the end of the length 13 and they would be set apart from each other without varying the speed of the driving reel.

What we claim is:

1. In a machine for making wire-spiral, mechanism for continuously coiling a wire around a continuously-advancing core-forming thread; automatically-operating mechanism for periodically severing a length of coil from the front end of the advancing coil; and means for automatically clamping the free end of the coil, in rear of the severed length, to the thread after each severing operation and while the advance of said thread continues.

2. In a machine for making wire-spiral, mechanism for continuously coiling a wire around a continuously-advancing core-forming thread; automatically-operating mechanism for periodically severing a length of coil from the front end of the advancing coil; and means for automatically moving the severed length away from the remainder of the coil and simultaneously clamping the free end of the latter to the thread after each severing operation and while the advance of said thread continues.

3. A wire-coiling machine, according to claim 1, in which the severing mechanism includes a movable cutter provided with a projection for squeezing the free end of the coil around the core thread to clamp it thereto.

4. A wire-coiling machine, according to claim 1, in which the severing mechanism includes a stationary abutment, and a movable cutter coacting with the same and provided with a projection for pressing the free end of the coil against the abutment so as to squeeze it around and clamp it to the core thread.

5. In a machine for making wire-spiral, mechanism for continuously coiling a wire around a continuously-advancing core-forming thread; and mechanism for automatically severing a length of coil from the front end of the advancing coil at regular intervals, said severing mechanism embodying a slidable cutter, and an impact element adapted to strike against and thereby actuate the cutter, said cutter adapted to return automatically to normal position after each cutting stroke.

6. A wire-coiling machine, according to claim 5, in which the cutter is provided with a projection for squeezing the free end of the coil remaining after each severing operating around the core thread to clamp it thereto.

7. In a machine for making wire-spiral, mechanism for continuously feeding wire and forming it into a coil, while progressively advancing such coil; means including a movable cutter for periodically severing lengths from the coil, and an actuating member for the cutter; electro-magnetic means for controlling the operation of said member; and means controlled by the advance of the coil for governing the energizing of said electro-magnetic means.

8. In a machine for making wire-spiral, mechanism for continuously feeding wire and forming it into a coil, while progressively advancing such coil; means including a movable cutter for periodically severing lengths from the coil, and a spring-loaded actuating member therefor; an electro-magnet; an armature normally holding said member in cocked position but adapted to release the same when said magnet is energized; and means controlled by the advance of the coil for governing the energizing of said magnet.

9. In a machine for making wire-spiral, mechanism for continuously feeding wire and forming it into a coil, while progressively advancing such coil; and means including a movable cutter for periodically severing lengths from the coil, and an impact element adapted to strike against and thereby actuate the cutter, said cutter adapted to return automatically to normal position after each cutting stroke.

10. In a machine for making wire-spiral, mechanism for continuously coiling a wire around a continuously-advancing core; mechanism for automatically severing a length from the front end of the advancing coil; and means associated with said severing mechanism for bending the coil at the time of each severing operation so as to prevent the core from being severed.

11. In a machine for making wire-spiral, mechanism for continuously coiling a wire around a continuously-advancing core; mechanism for automatically severing a length from the front end of the advancing coil; and a depressible fork associated with said severing mechanism for bending the coil at the time of each severing operation so as to prevent the core from being severed.

In testimony whereof we affix our signatures.

JEAN PIERRE MANENT.
MARIUS MANENT.